(No Model.)
J. WAGNER.
VEGETABLE CUTTER AND GRATER.
No. 543,201. Patented July 23, 1895.
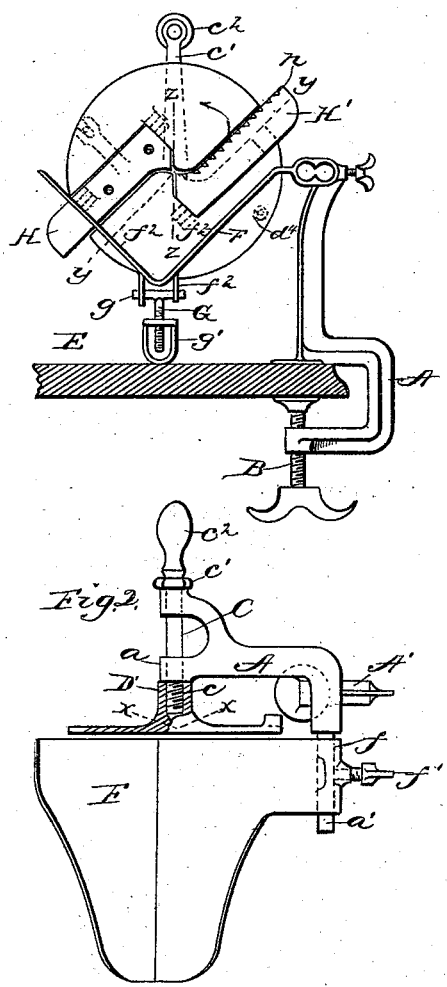
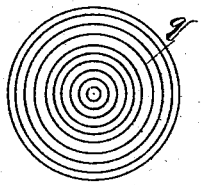
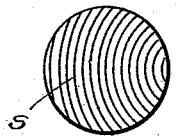
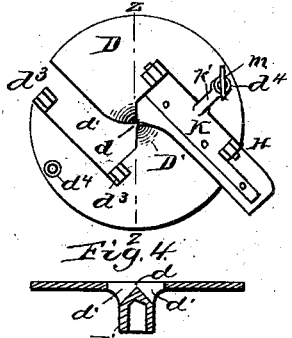
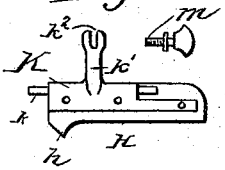
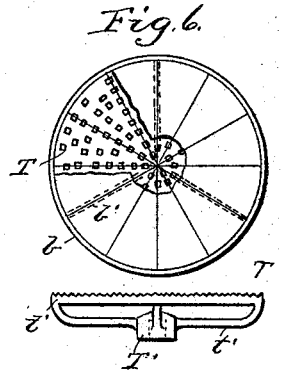
Witnesses:
J. M. Fowler Jr.
Chas. J. Stockman
Julius Wagner
Inventor.
by H. Stewart
Attorney

UNITED STATES PATENT OFFICE.

JULIUS WAGNER, OF READING, PENNSYLVANIA.

VEGETABLE CUTTER AND GRATER.

SPECIFICATION forming part of Letters Patent No. 543,201, dated July 23, 1895.

Application filed January 19, 1895. Serial No. 535,525. (No model.)

*To all whom it may concern:*

Be it known that I, JULIUS WAGNER, a citizen of the United States, residing at Reading, county of Berks, State of Pennsylvania, have invented certain Improvements in Vegetable Cutters and Graters, of which the following is a specification.

My invention relates to mechanism adapted for cutting or grating vegetables, &c., and my main object is to enable certain results to be attained which have not been heretofore provided for, while at the same time producing a simple and economical machine.

The invention is fully described in connection with the accompanying drawings, and the novel features are pointed out in the claims.

Figure 1 is a front elevation of a machine embodying my invention. Fig. 2 is a plan view of the same, showing the cutter-disk in section on the line $y\ y$ of Fig. 1, the knives being removed. Fig. 3 is a rear view of the cutter-disk without the knives and showing the shaft connection in section on the line $x\ x$ of Fig. 2. Fig. 4 is a cross-sectional view of the disk, taken on the line $z\ z$ of Figs. 1 and 3. Fig. 5 shows the preferred form of knife separately, together with its adjusting-screw. Fig. 6 shows the grater-disk in two views. Fig. 7 indicates a cutter-disk with fixed grooving-prongs. Figs. 8, 9, and 10 are introduced to assist in understanding the operation of the machine.

A represents the supporting-frame, which is provided with a clamping-arm A', having a clamping-screw B, by means of which the machine is fastened to the edge of a table E in an ordinary manner. The cutting-disk D is removably secured to the screw-threaded end $c$ of the shaft C, which is mounted in bearings $a\ a$ of the frame and provided with suitable means for rotating it, consisting in the construction shown of a crank $c'$ with handle $c^2$. The disk is provided on its rear face with a hub D', which is screw-threaded for a portion of its depth only to fit the end $c$ of the operating-shaft, which is thus connected to the disk. In Figs. 1 and 3 the latter is shown provided with two openings $d'\ d'$ for the reception of knives and the passage of cuttings. These openings join at the center of the disk, the shaft connection D' being cut away at the rear of the opening in the disk, so as to prevent obstruction to the passage of any part of the material being operated upon. The form preferably given to the disk end of the shaft-hub is indicated most clearly in Fig. 4, which shows it beveled to a central point $d$. The knife H is shown as a separate plate fixed to a carrying-frame K, which is provided with trunnions $k\ k$, adapted to be mounted in bearing-lugs $d^3\ d^3$, formed on the rear face of the disk. This knife-frame is also provided with an adjusting-arm $k'$, the slotted end $k^2$ of which is engaged by an adjusting-screw M, the end $m$ of which screws into the boss $d^4$, so as to swing the cutting-edge of the knife toward or away from the face of the disk to vary the depth of the cut. The inner end $h$ of the cutting-edge of the knife is arranged to extend with the opening $d'$ practically to the center of the disk, and its outer end may project beyond the edge of the disk, as shown in Fig. 1, so as to increase the cutting-circle.

The supporting-frame A is provided with an arm $a'$, extending beyond the cutting-face of the disk, and upon this I adjustably mount a feed box or trough F by means of a bearing $f$, provided at one side of the same. This feed-box is arranged to swing around the arm $a'$ as a center, so as to vary the position of the sloping walls $f^2\ f^2$, by which the articles being operated upon are guided with relation to the center of the disk, and it is at the same time adjustable as to its distance from the face of the disk. To secure it in the position to which it is adjusted I provide a set-screw $f'$ to clamp it to the arm $a'$, and also, when the box is arranged to swing in a vertical plane, as shown, hinge to the under side of the box a supporting-bracket consisting of adjustable parts G and $g'$, adapted to provide for supporting the box at different heights from the level of the table E.

In Fig. 1 I have represented one knife-plate H as it is shown in detail in Fig. 5 and another plate H' provided with a radial series of grooving teeth or prongs $n$, formed by making oblique cuts in the edge of the plate and bending the cut metal outward at right angles to the plate, as indicated, and in Fig. 7 I have shown a modified construction, in which the plate H' is dispensed with and the prongs n' are projected directly from the face of the disk D. This figure also shows a face view of the knife-opening d', indicating how the cuttings and the core (if any) are guided through to the rear of the disk.

In Fig. 6 I have shown a grater-disk T, which is fixed to a circular frame t, having a shaft-connecting hub T' and arms or spokes t'. This grater may be quickly substituted for the knife-disk D, when desired, and like the latter is made operative over its whole surface, the grater-perforations extending to the very center of the disk and clearance-space being provided at the rear between it and the connecting-hub T'.

The main advantage which results from the novel arrangement of my rotary disk and knife is that the cutting is done equally over the whole face of the disk or within the full sweep of the knife or knives. Thus if for instance, a head of cabbage is to be operated upon it may be fed directly against the center of the disk, and, though one knife only be employed and its total length be only equal to half the diameter of the cabbage-head, yet the whole surface will be operated upon at each revolution of the disk, the knife cutting during the whole revolution instead of intermittently, as usual. In Fig. 8 I have indicated the special form of cutting which may be thus made on my machine, the radius r of which may be equal to the full length of the knife and the center r' being in practice a small hole at the center of the disk, where, if the inner point of the knife is not exactly at the center of the rotation, a small core-piece is formed, and, passing through the disk, is diverted by the point d, Fig. 4, so as to clear the shaft-connecting hub D'.

The grooving-prongs n or n' are employed in connection with a slicing-knife H when it is desired to convert the material operated upon into rings or strips. Thus, if the article operated upon be fed centrally against the disk, circular grooves, as indicated at q, Fig. 9, are formed, and the knife following after will cut the material into rings of different sizes; or if the article be fed against the disk to one side of the center then grooves such as indicated at s, Fig. 10, will be formed and the knife will cut off strips of varying curvatures.

The operation when the grater-disk T is substituted for the knife-disk is similar to that just described, the center being as fully operative as other parts of the grater.

In all cases the feed box or hopper may be readily adjusted so as to most conveniently support the article to be operated upon; and in the case of a horizontal machine, such as is indicated in the drawings, it may be arranged at an incline to the face of the disk, so as to facilitate the feeding.

It is obvious that my machine may be converted into a vertical one instead of horizontal and that the same may be arranged to be operated by other means than a crank, as shown. The knives also, instead of being separately formed and adjustably mounted, as in the preferred construction described, may be varied in form, as may also other details, and I do not, therefore, desire to limit myself to the exact construction shown; but

What I claim is—

1. A cutter disk having a central shaft connection on the rear face thereof, the inner end of the shaft connection being beveled, knives with the inner ends of their cutting edges abutting at the central line of the shaft, and knife openings uniting at the center of the disk and extended outward with the knives, substantially as and for the purpose set forth.

2. A cutter disk having a central shaft connection on the rear face thereof and a knife opening or openings extending to the center of the disk, the inner end of said shaft connection being beveled to guide the central cuttings, substantially as and for the purpose set forth.

3. A cutter disk having a central shaft connection, and a knife opening extending to the center of the disk, said shaft connection having a beveled portion communicating with the knife opening, a series of grooving prongs or edges projecting from the front face of the disk at different distances from the center thereof and a slicing knife in front of said opening operating in connection with said grooving prongs, substantially as and for the purpose set forth.

4. The combination with the rotary disk and its supporting frame, of a feed box carried by said frame and capable of adjustment in the plane of the disk, substantially as and for the purpose set forth.

5. The combination with the rotary disk and its supporting frame, of a feed box carried by said frame and capable of adjustment in the plane of the disk, and also at right angles thereto, substantially as and for the purpose set forth.

6. The combination with the rotary disk and its supporting frame, of a feed box, pivoted to said frame at a point beyond the disk and means for adjustably securing the same in varying positions with relation to said disk, substantially as and for the purpose set forth.

7. The combination with the rotary disk and its supporting frame, of the feed box pivoted to the said frame at a point beyond the disk and adapted to swing in a vertical plane in front of said disk, and an adjustable support fixed to the under side of said box, substantially as set forth.

In testimony whereof I affix my signature in presence of two witnesses.

JULIUS WAGNER.

Witnesses:
DAVID LEVAN,
W. G. STEWART.